United States Patent [19]

Rosell et al.

[11] Patent Number: 4,672,884
[45] Date of Patent: Jun. 16, 1987

[54] ROTARY HYDRAULIC DISTRIBUTOR, PARTICULARLY FOR AN ASSISTED STEERING MECHANISM

[75] Inventors: Jorge E. Rosell; Carlos M. Folch, both of Barcelona, Spain

[73] Assignee: Bendiberica S.A., Barcelona, Spain

[21] Appl. No.: 790,584

[22] Filed: Oct. 23, 1985

[30] Foreign Application Priority Data

Oct. 29, 1984 [ES] Spain .................................. 537.458

[51] Int. Cl.$^4$ ............................................. F15B 9/10
[52] U.S. Cl. .................................. 91/375 R; 91/377; 91/467; 137/625.21
[58] Field of Search ...................... 91/375 R, 377, 380, 91/467; 137/625.21

[56] References Cited

U.S. PATENT DOCUMENTS

| | | | |
|---|---|---|---|
| 3,227,178 | 1/1966 | Elwell | 137/615.21 |
| 4,310,024 | 1/1982 | Bacardit | 91/375 R X |
| 4,488,475 | 12/1984 | Masuda et al. | 137/625.21 X |
| 4,527,591 | 7/1985 | Bacardit | 137/615.11 |

FOREIGN PATENT DOCUMENTS

| | | |
|---|---|---|
| 0077710 | 4/1983 | European Pat. Off. . |
| 0095415 | 11/1983 | European Pat. Off. . |
| 2242020 | 2/1974 | Fed. Rep. of Germany . |

*Primary Examiner*—Carlton R. Croyle
*Assistant Examiner*—Mark A. Williamson
*Attorney, Agent, or Firm*—Larry J. Palguta; Ken C. Decker

[57] ABSTRACT

The distributor comprises a star-shaped rotor (2) arranged between two concentric components which are spaced axially and are fixed in rotation to a second valve portion (60); a C-shaped centering return spring (40) is arranged around the rotor (2) and cooperates, by its facing ends, with a projection (100) of one of the arms (10$_1$) of the rotor and with adjacent projections of the second valve portion.

11 Claims, 11 Drawing Figures

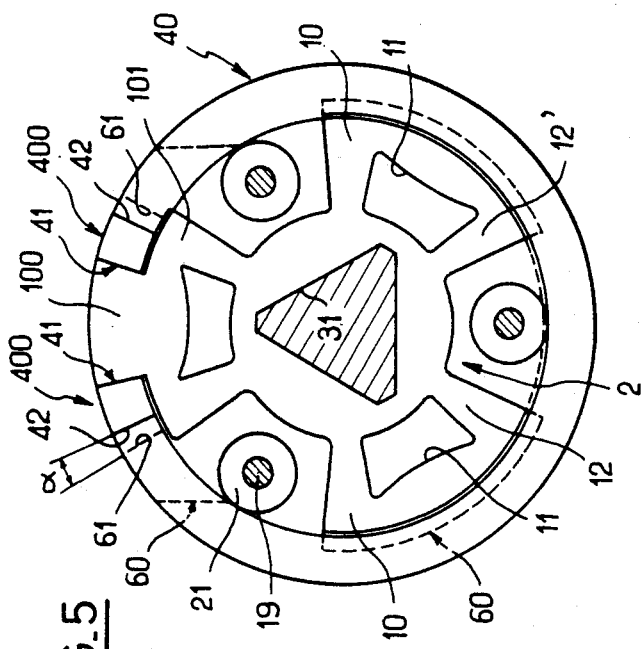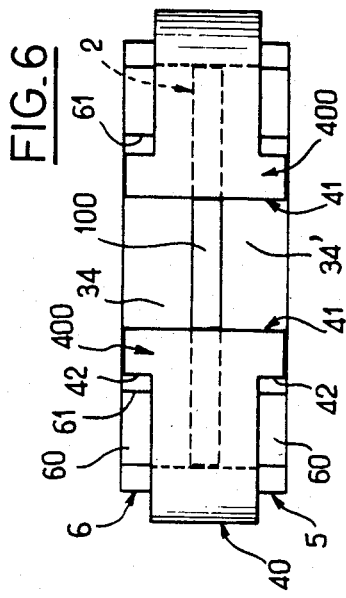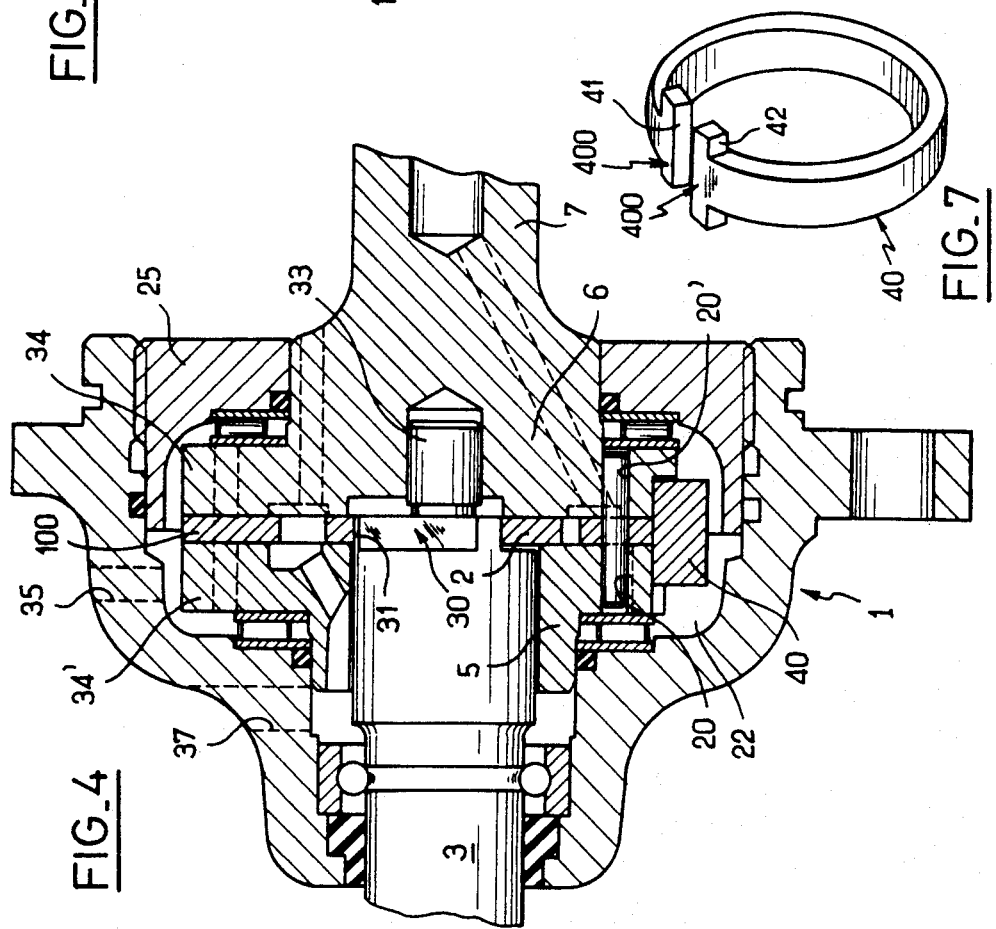

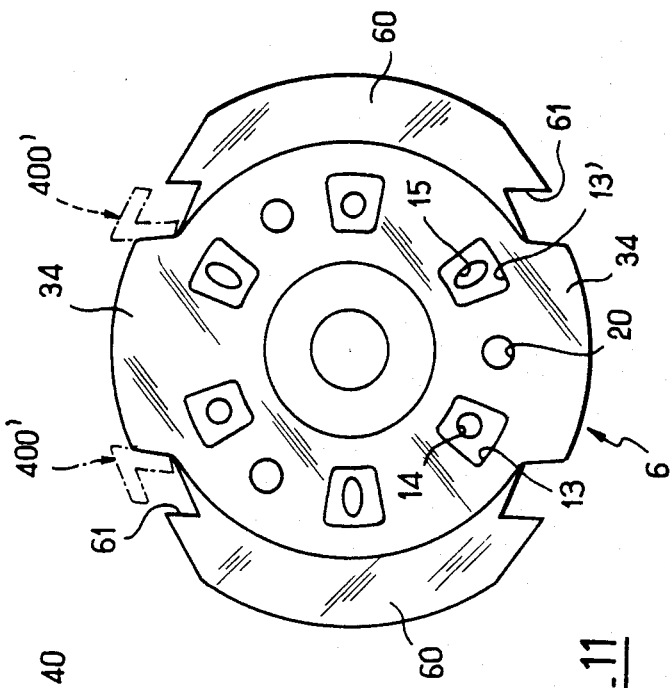
FIG_11
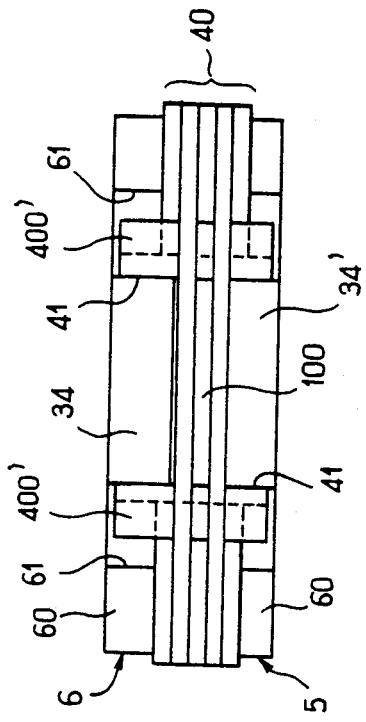
FIG_10

ROTARY HYDRAULIC DISTRIBUTOR, PARTICULARLY FOR AN ASSISTED STEERING MECHANISM

The present invention concerns a rotary hydraulic distributor particularly for an assisted steering mechanism of a motor vehicle, of the type comprising, in a casing, first and second rotary valve members firmly fixed in rotation respectively to an input shaft and to an output shaft which are coaxial, the two valve portions co-operating mutually so as to selectively form fluid flow paths between a source of fluid under pressure, the respective compartments of a hydraulic assistance actuator and a reservoir as a function of the relative angular position of the two valve members on each side of a central rest position, the first valve member consisting of a rotor in the form of a star-shaped disc having arms which are formed with apertures which are closed peripherally and are each bounded laterally (relative to the direction of rotation) by masking portions of the corresponding arm which are essentially radial, the rotor co-operating in sliding contact by its axially opposed surfaces with adjacent axial surfaces of the second valve portion facing them, into which open, firstly, in line with said masking portions, distribution openings to be connected to the compartments of the hydraulic actuator, and secondly, in line with the apertures of the rotor arms, openings for the return of fluid to the reservoir, and a resilient device for returning and for centering the input and output shafts and including at least one C-shaped spring arranged around the input shaft, and first and second connection means joining the input shaft and the output shaft, respectively, to the C-shaped spring.

A distributor of this type is described in U.S. Pat. No. 4,527,591, the content of which is incorporated here for reference. The arrangement of the valve members in the distributor permits the suppression of problems of peripheral sealing of the first valve member or star-shaped rotor, and to integrate components for fixing in rotation the different elements which are positioned axially side by side and which constitute the second valve member inside the peripheral circle of the rotor. In said document, the resilient centering return means between the input and the output shafts (and therefore between the first and second distributor members) consist of a pair of C-shaped springs arranged between an internal extended portion of the input shaft and the output shaft, in an arrangement requiring a large axial length for the distributor assembly.

One object of the present invention is to propose a hydraulic distributor of the type mentioned above, of simplified construction, more particularly as concerns the construction of the fluid flow passages, allowing a considerable reduction in the axial dimensions of the distributor and allowing various arrangements for the return and centering means in a general arrangement of robust design, of low manufacturing cost and having increased reliability and versatility.

To achieve this, according to a feature of the invention, the C-shaped spring is arranged around the star-shaped rotor, the first connecting means consisting of a portion of at least one of the arms of the star-shaped rotor which extends radially outwards between the facing ends of the C-shaped spring, the second connecting means consisting of at least one external projecting portion of the second valve member extending adjacent the first connecting means.

According to another feature of the invention, the second valve member consists of two concentric components which are axially spaced and are assembled so as to be fixed in rotation to one another while defining between their facing axial surfaces, a space in which the rotor is accomodated.

With such an arrangement, the C-shaped return and centering spring co-operates directly with the disc-shaped rotor of the distributor and with the second distributor member whose construction and composition are simplified.

Another object of the present invention is to propose an arrangement of the above type which also allows a required lost-motion coupling between the distributor members to be achieved by the C-shaped return and centering spring.

To achieve this, according to a more particular feature of the invention, the C-shaped spring has bearing zones which extend axially on each side of the spring and which include rear bearing zones adapted for co-operation in bearing engagement with external abutments of at least the second valve member so as to form a lost-motion coupling between the first and second valve member.

Other features and advantages of the present invention will emerge from the following description of embodiments given by way of illustration but not limiting in any way, with reference to the accompanying drawings, in which:

FIG. 4 is a sectional view similar to that shown in FIG. 1 showing a second embodiment of the invention;

FIGS. 5 and 6 are views similar to those shown in FIGS. 2 and 3 relating to this second embodiment;

FIG. 7 is a perspective view of the C-shaped spring of the embodiment shown in FIGS. 4 to 6;

FIGS. 9 and 10 are views similar to those shown in FIGS. 2 and 3 relating to this third embodiment; and FIG. 11 is an end view through the plane XI—XI of the component of the second distributor component which is fixed to the output shaft.

In the description which follows, identical or similar components carry the same reference numbers, possibly primed.

Figures 1, 2, 3:
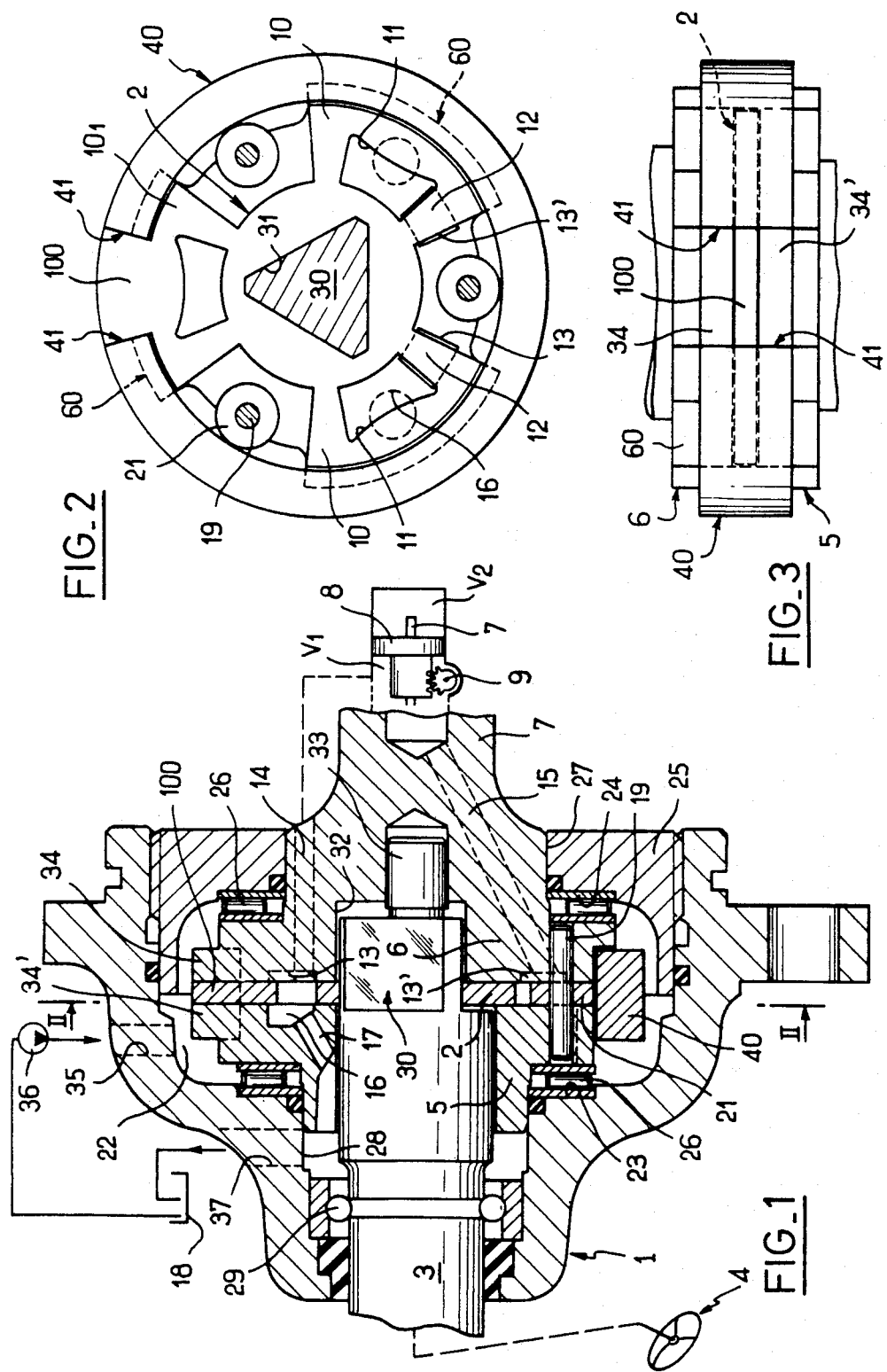
FIG. 1 is a diagrammatic view of a longitudinal section of a first embodiment of a hydraulic distributor according to the invention.
FIG. 2 is a diagrammatic view of a transverse section through the plane II—II shown in FIG. 1.
FIG. 3 is a partial diagrammatic plan view of the assembly shown in FIG. 2.
Figure 9:
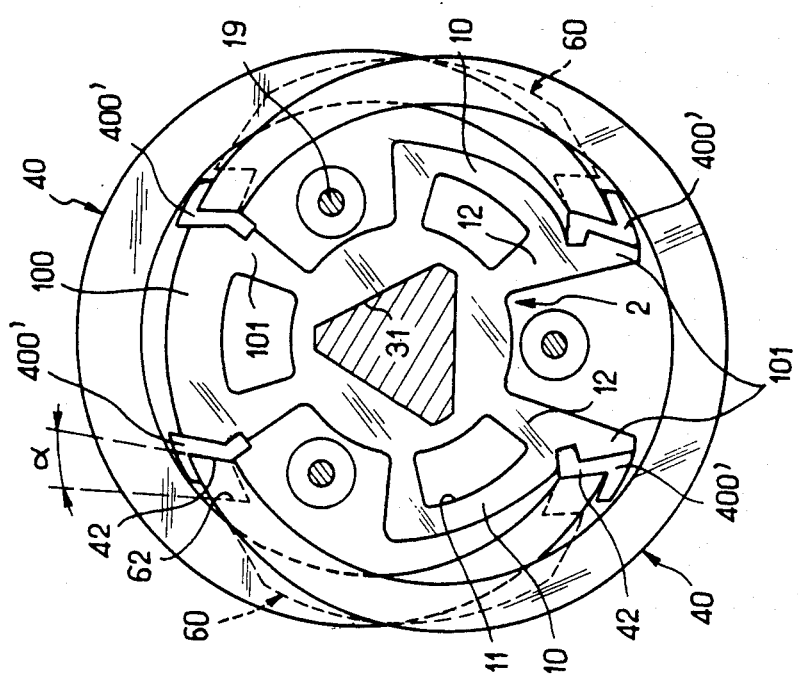

FIG. 1 shows the end of an assisted steering mechanism which incorporates essentially, in a casing 1, a hydraulic distributor incorporating a first valve member consisting in this case of a rotor in the form of a star-shaped disc 2 coupled in rotation to an input shaft 3 which is typically intended to be connected to a steering wheel 4 of a motor vehicle, and a second distributor member 5-6 which is fixed in rotation to an output shaft 7 which is typically joined, by a ballnut connection, to a piston 8 of an assistance cylinder meshing with an output pinion 9 which is connected to a linkage for controlling the steerable wheels of the vehicle.(not shown).

In accordance with the invention, the second valve member consists of two concentric components 5 and 6 which are axially spaced and are arranged so as to be fixed in rotation with one another while defining a space, between their parallel axial surfaces facing each other, in which the star-shaped rotor 2 is rotationally slidingly housed. In accordance with the general valve construction described in U.S. Pat. No. 4,527,591 mentioned above, whose contents are supposed to be incorporated herewith for reference, the rotor 2 typically incorporates, in the example shown, three arms radially outwardly extending 10, each arm 10 being formed with an aperture 11 which is closed peripherally and is bounded laterally by substantially radially extending masking portions 12 of the corresponding arm. The second valve component (in this case the component 6) has distribution openings 13, 13′ formed in its axial face co-operating with the rotor 2, the distribution openings 13, 13′ being of substantially trapezoidal shape and being situated, in the normal centered rest configuration of the two valve members facing the masking portions 12 of the arms 10 of the rotor, these distribution openings 13, 13′ also being connected by passages such as 14 and 15 to the compartments $V_1$ and $V_2$, respectively, of the assistance cylinder of which the piston 8 forms part. The second valve component (in this case the other component 5) incorporates, in its axial face co-operating with the rotor 2, return openings 16 communicating permanently with the apertures 11 of the arms 10 of the rotor 2, these return openings 16 communicating via passages such as 17 with a reservoir 18.

In the embodiment shown, the two components 5 and 6 of the second valve member are coupled to one another in rotation by axial pins 19 which are housed in aligned bores 20, 20′ (FIG. 4) formed in components 5 and 6, the pins 19 each passing through a spacing washer 21 of the same thickness as the disc-shaped rotor 2, the spacing washers 21 being situated in the space between two adjacent arms of the rotor 2, radially inside the normal peripheral circle of the arms 10 of the rotor 2. In the embodiment shown, the component 6 is formed by an enlarged end portion of the output shaft 7, the distributor being housed in an internal chamber 22 of the casing 1 which is bounded axially between two frontal walls facing each other 23 and 24, respectively, of the casing 1 and of a cover 25 which is coaxial with the output shaft 7 and is sealingly mounted on the casing 1, the components 5 and 6 of the second valve portion being positioned and guided in rotation between the wall of the casing 1 and the cover 25 by axial bearings 26. In addition it will be noted that the component 6 is guided in rotation in a bore 27 in the cover 25, the component 5 incorporating a sleeve portion which is concentric with the input shaft 3 and is housed in rotation in a stepped bore 28 of the casing 1 in which there is also arranged a bearing 29 for the input shaft 3.

In the embodiment shown in FIG. 1, the input shaft 3 comprises an intermediate portion 30 of triangular cross-section with is fitted into a corresponding triangular opening 31 in the hub of the star-shaped rotor 2, the intermediate portion 30 of the input shaft 3 extending into a cavity 32 of the component 6 which also has a triangular cross-section but has dimensions which are larger than those of the intermediate portion 30 so that the latter can normally pivot through a reduced angular range in the cavity 32 before driving in rotation the component 6 also, according to an arrangement of lost-motion coupling which is well known in the technology of hydraulic distributors. The input shaft 3 has a cylindrical end of reduced diameter 33 which is housed in a coaxial bore in the component 6.

In accordance with a feature of the invention, one of the arms ($10_1$) of the rotor 2 comprises, in the example shown, a projecting portion 100 which extends outwards beyond the normal peripheral circle of the arms 10, between two external projecting portions 34 and 34′ of the components 6 and 5 of the second valve member, respectively, the lateral sides of the projections 100 and 34-34′ extending, when in a rest condition substantially in the same two planes symmetrical relative to the section plane of FIG. 1. A C-shaped spring 40 is arranged around the rotor 2 by being positioned and guided on the external periphery of the components 5 and 6 owing particularly to external projecting parts 60 of the component 6, in such a way that the ends facing each other or bearing surfaces 41 of the C-shaped spring 40 come to bear against respective lateral sides of the projections 100 and 34,34′ of the components of the distributor, preferably with an initial preload of the C-shaped spring 40. It will be understood that the C-spring 40 thus ensures the mutual centering of the rotor 2 and of the components 5 and 6 as well as the return of the distributor members towards the central rest position when the rotor 2 is moved relative to the components 5 and 6.

As shown in FIG. 1, it will be noted that the passages 14 and 15 for distributing fluid to the chambers $V_1$ and $V_2$ of the assistance cylinder are formed directly in the output shaft 7 and its enlarged end portion forming the component 6, the casing 1 having a fluid inlet passage 35 opening in the periphery of the internal chamber 22 and intended to be connected to a source of fluid under pressure 36, the casing 1 also having a return passage 37 intended to be connected to the reservoir 18 and opening into the stepped bore 28 between the bearing 29 and the adjacent axial bearing 26, the return passage 17 in the component 5 communicating with the stepped bore 28 of the casing 1. The distributor which is described above operates as follows: in the normal rest configuration shown in FIG. 2, fluid under pressure coming from the source 36 fills the internal cavity 22 around the distributor members and enters, via the spaces between two adjacent arms 10 of the rotor 2, into the distribution openings 13, 13′ which are not completely obstructed by the masking portions 12 of the arms 10 of the rotor 2, and from there into the apertures 11 of the arms 10, from where the fluid returns to the reservoir 18 through the openings 16, the passages 17 and the conduit 37. In these conditions, there is no pressure differential created between the two chambers $V_1$ and $V_2$ of the assistance cylinder. If, however, the rotor 2 is moved angularly offset in either direction relative to the central rest position, for example to the left in FIG. 2, the restriction between the distribution opening 13 and the masking portion 12 closes while the restriction between the distribution opening 13′ and the corresponding masking portion 12 opens, the effect of which is to cause a pressure differential between the chambers $V_1$ and $V_2$ assisting the relative rotary movement caused by the input shaft 3. In doing this, the projection 100 of the rotor causes a separation of the facing surfaces 41 of the spring, cessation of the force on the input shaft 3 tending to offset angularly the rotor 2 from the components 5 and 6 causing the spring 40 to bring the distributor components into the initial centered rest configuration.

The embodiment shown in FIGS. 4 to 7 is essentially identical to that described above in relation with FIGS.

1 and 3 and differs therefrom essentially in that the C-shaped spring 40 also provides the lost-motion coupling between the input shaft 3-rotor 2/output shaft 7-components 5 and 6 assemblies. For this purpose, the C-shaped spring 40 comprises facing and axially enlarged end zones 400 thus defining, in addition to the bearing surfaces facing each other 41, rear bearing zones 42 which extending axially on each side of the body of the spring 40 and which are capable of cooperating in bearing engagement with abutment surfaces 61 formed on the projecting peripheral zones 60 for guiding and for axially holding the spring 40, these abutment surfaces 61 normally being separated by an angle α from the rear bearing zones 42 of the enlarged ends 400 of the spring 40 in the centered rest configuration of the distributor members. It will be noted that co-relatively the intermediate zone of triangular cross-section 30 of the input shaft 3 is reduced axially so as to engage only the rotor 2, this intermediate zone 30 being directly extended by the cylindrical centering end 33, that cavity of triangular internal cross-section 32 of the component 6 being suppressed.

Figure 8:
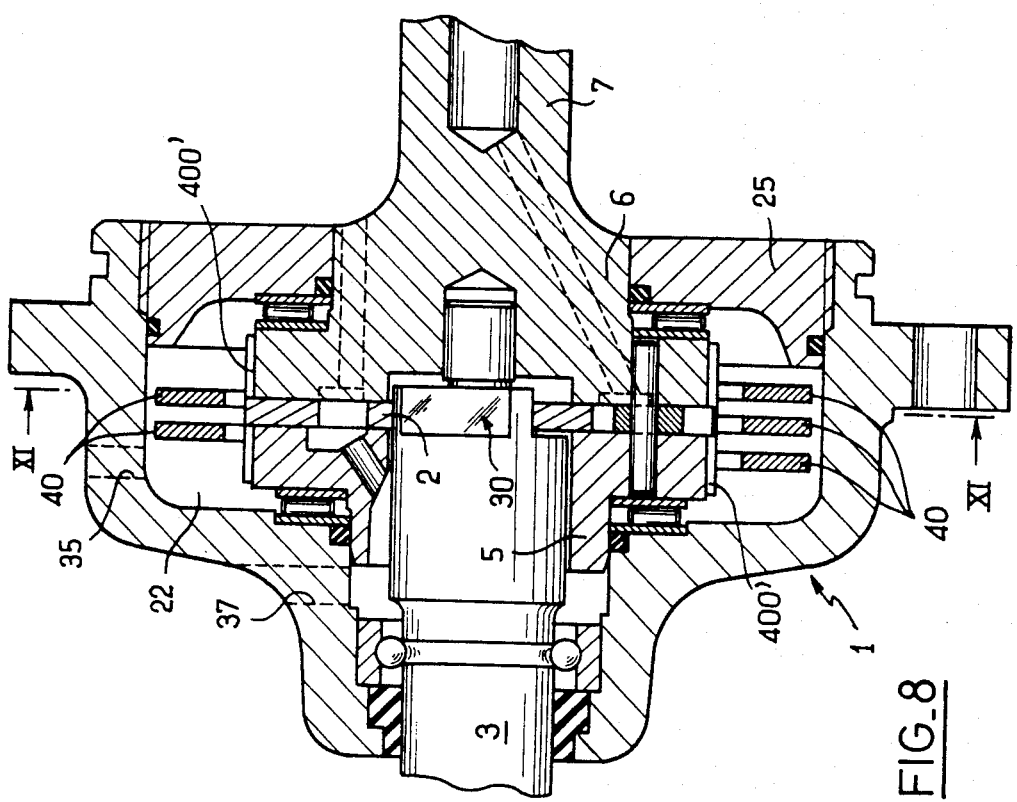
FIG. 8 is a view of a longitudinal section similar to that shown in FIG. 1 showing a third embodiment of the invention.

The embodiment shown in FIGS. 8 to 11 is similar in most respects to that which is described above relating to FIGS. 4 to 7. In this third embodiment the elastic centering means also forming a lost-motion coupling consist of at least two C-shaped springs 40 situated in opposition (that is to say with the gap between the opposed ends of the one diametrically opposite the gap between the opposed ends of the other). Typically, as shown in Figure 8, the device incorporates three C-shaped springs 40 in one direction and two C-shaped springs 40 in the other direction interleaved between the preceding springs. It will be noted that the springs 40 which are orientated in one direction co-operate with the opposed ends of the projecting portion 100 on the arm 10₁ as in the preceding embodiments while the springs in opposition have their ends co-operating with two projecting portions 101 belonging to two other arms of the rotor 2 but providing between their opposed bearing surfaces essentially the same distance as between the opposed bearing surfaces of the projection 100 of the arm 10₁. In this embodiment, the enlarged ends forming bearing zones of the single spring of the embodiment shown in FIGS. 4 to 7 are here substituted by axial keys 400' whose transverse crosssection is essentially S-shaped or Z-shaped, interposed between the bearing surfaces of the projections 100 or 101 of the arms 10 of the rotor 2 and the facing ends of the different C-shaped springs 40. In the same manner as before, the keys 400' define, axially on each side of the C-shaped springs, second rear bearing zones 42 adapted to come to bear against the abutment surfaces 61 of the components 6 and 5 thus limiting the permissible rotation of the rotor 2 relative to these components 5 and 6 to an angle α. The operation of this embodiment is identical in all points to that of the preceding embodiments.

Although the present invention has been described in relation to particular embodiments, it is not limited thereto, but on the contrary is capable of modifications and variants which will be apparent to those skilled in the art, more particularly as concerns the mounting of the distributor components and the input shaft in the casing.

What is claimed is:

1. A hydraulic distributor, particularly for an assisted steering system of a motor vehicle, which comprises, in a casing, a first rotary valve member and a second rotary valve member fixed in rotation respectively to an input shaft and an output shaft which are coaxial, said rotary valve members cooperating mutually so as to form selectively fluid flow passages between a source of fluid under pressure, respective compartments of a hydraulic assistance actuator, and a reservoir as a function of relative angular position of said rotary valve members on each side of a central rest position, said first rotary valve member consisting of a rotor in the form of a star-shaped disc having arms formed with apertures which are closed peripherally and each bounded laterally by substantially radial masking portions of the corresponding arm, said rotor having opposite axial surfaces cooperating in sliding contact with adjacent axial surfaces facing each other of said second rotary valve member, into which open, firstly, in line with said masking portions, distribution openings respectively connectable to said compartments of said hydraulic actuator, and secondly, in line with said apertures of said arms of said rotor, fluid return openings connectable to said reservoir, and a resilient device for returning and centering said input and output shafts and including at least one C-shaped spring having facing ends and arranged around said input shaft, and first and second connecting means joining said input and output shafts, respectively, to said c-shaped spring, characterized in that said C-shaped spring is arranged around said star-shaped rotor, and in that said first connecting means comprises a portion of at least one of said arms of said star-shaped rotor which extends radially outwardly between said facing ends of said C-shaped spring, said second connecting means comprising at least one external projecting portion of said second rotary valve member which extends adjacent said first connecting means, and said C-shaped spring having bearing zones extending axially on each side of said spring.

2. The hydraulic distributor according to claim 1, characterized in that said bearing zones are formed integrally with said facing ends of said spring.

3. The hydraulic distributor according to claim 1, characterized in that said bearing zones consist of keys interposed between said facing ends of said spring and the first and second connecting means, respectively.

4. The hydraulic distributor according to claim 3, characterized in that the distributor comprises at least two C-shaped springs arranged in opposition.

5. The hydraulic distributor according to claim 1, characterized in that said C-shaped spring further comprises rear bearing zones which are capable of cooperating in bearing engagement with external abutments of at least said second rotary valve member so as to form a lost-motion coupling between said first rotary valve member and said second rotary valve member.

6. The hydraulic distributor according to claim 1, characterized in that two components of said second rotary valve member are arranged between two facing internal front walls in said casing and with interposed axial bearings.

7. The hydraulic distributor according to claim 6, characterized in that said casing defines, between said two facing internal front walls, an internal chamber which is intended to be connected permanently to said source of pressure.

8. The hydraulic distributor according to claim 1, characterized in that said second rotary valve member comprises two concentric components which are axially spaced and are arranged so as to be fixed in rotation to one another and have axial surfaces facing each other defining therebetween a space in which said rotor is accommodated.

9. The hydraulic distributor according to claim 8, characterized in that said two concentric components of said second rotary valve member are coupled in rotation by at least one pin extending axially between two adjacent arms of said rotor.

10. The hydraulic distributor according to claim 8, characterized in that each component of said second rotary valve member comprises an external projecting portion.

11. The hydraulic distributor according to claim 1, characterized in that said C-shaped spring is positioned axially and radially around said two rotary valve members.

* * * * *